United States Patent [19]

Orchard et al.

[11] Patent Number: 5,404,266
[45] Date of Patent: Apr. 4, 1995

[54] TEMPORARY POWER CENTER FOR CONSTRUCTION SITE

[75] Inventors: Ronald J. Orchard; Darrel A. Holtz, both of Mankato, Minn.

[73] Assignee: General ELectric Company, New York, N.Y.

[21] Appl. No.: 188,973

[22] Filed: Jan. 31, 1994

[51] Int. Cl.⁶ .............................................. H02B 9/00
[52] U.S. Cl. ......................................... 361/667; 174/38; 361/672; 439/517
[58] Field of Search ............ 174/38, 45 R, 51; 200/51 R; 361/641, 643, 659, 660, 661, 663, 671, 664–667, 668, 672; 324/110, 156; 439/517, 189, 535, 540, 560, 651, 694

[56] References Cited

U.S. PATENT DOCUMENTS

| | | |
|---|---|---|
| 1,898,634 | 2/1933 | Lewis ........................... 361/663 |
| 2,870,238 | 1/1959 | Davis ........................... 361/667 |
| 3,707,653 | 12/1972 | Coffey ......................... 361/660 |
| 3,716,762 | 2/1973 | Shrader . |
| 3,796,822 | 3/1974 | Eickman ....................... 174/48 |
| 3,955,123 | 5/1976 | Goodridge .................... 361/660 |
| 4,025,825 | 5/1977 | Shrader . |
| 4,369,484 | 1/1983 | Fugate .......................... 361/660 |
| 5,184,279 | 2/1993 | Horn ............................. 174/38 |
| 5,196,988 | 3/1993 | Horn ............................. 361/362 |

Primary Examiner—Gerald P. Tolin
Attorney, Agent, or Firm—Richard A. Menelly

[57] ABSTRACT

A single unit enclosure containing an electric power meter compartment and a power receptacles compartment is adapted for use on a temporary construction site employing underground utility cables. The meter compartment is located under the power receptacles compartment and is protected from the environment by means of the overhang provided by the access door attached to the power receptacles compartment. The incoming power cables to the enclosure are also protected by means of the access door overhang.

8 Claims, 3 Drawing Sheets

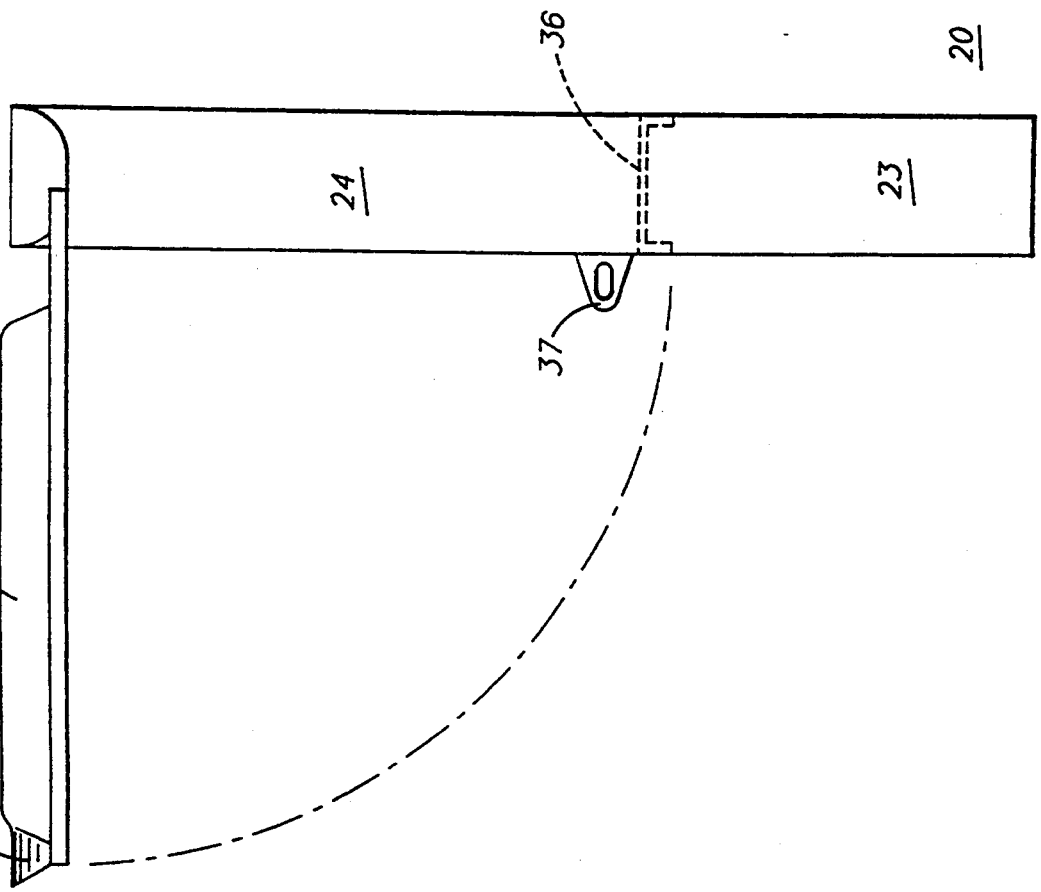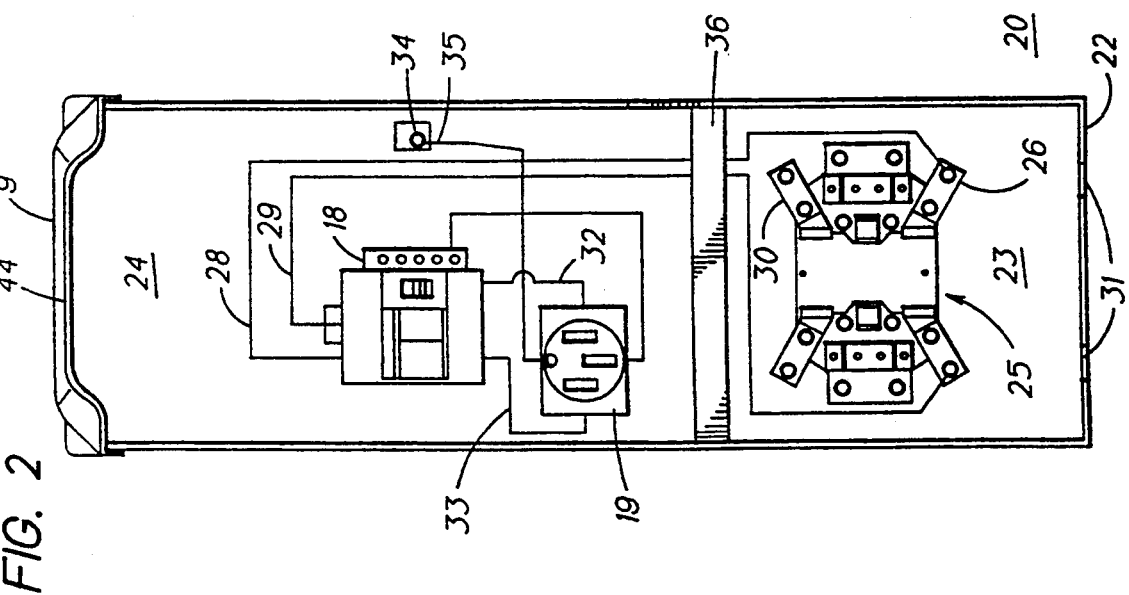

TEMPORARY POWER CENTER FOR CONSTRUCTION SITE

BACKGROUND OF THE INVENTION

Power centers in the form of an exterior enclosure containing an electric power meter superjacent a power receptacles enclosure are commonly-used at temporary construction sites to supply electric power and to insure that the power is metered. In the past, most electric power to the sites was supplied by overhead utility power cables which required the meter to be installed on the top part of the enclosure. U.S. Pat. Nos. 3,716,762 and 4,025,825 describe such enclosures.

The advent of the large number of underground utility cables to such construction sites has resulted in the use of a separate meter assembly connecting with the underground service cables and a separate power receptacles enclosure connected with the separate meter assembly. State and local electrical codes prohibit the incoming utility cables to be bent in a reverse direction as required with the use of earlier power centers.

It would be economically feasible to provide a power center that would accommodate both a meter along with the power receptacles within a common enclosure to eliminate the separate components requirement as well as to eliminate the time and expense involved in electrically-interconnecting the separate components.

SUMMARY OF THE INVENTION

An integrated power center enclosure for temporary construction sites allows connection directly with an electric power meter and associated electric power receptacles by means of underground service cables. The arrangement of the power meter under the receptacle compartment protects the power meter from severe environmental conditions.

BRIEF DESCRIPTION OF THE DRAWINGS

FIG. 2 is a front plan view of the integrated load center according to the invention;

FIG. 3 is a side view of the integrated load center of FIG. 2 with the power receptacles access door in an open position.

DESCRIPTION OF THE PREFERRED EMBODIMENT

Figure 1:
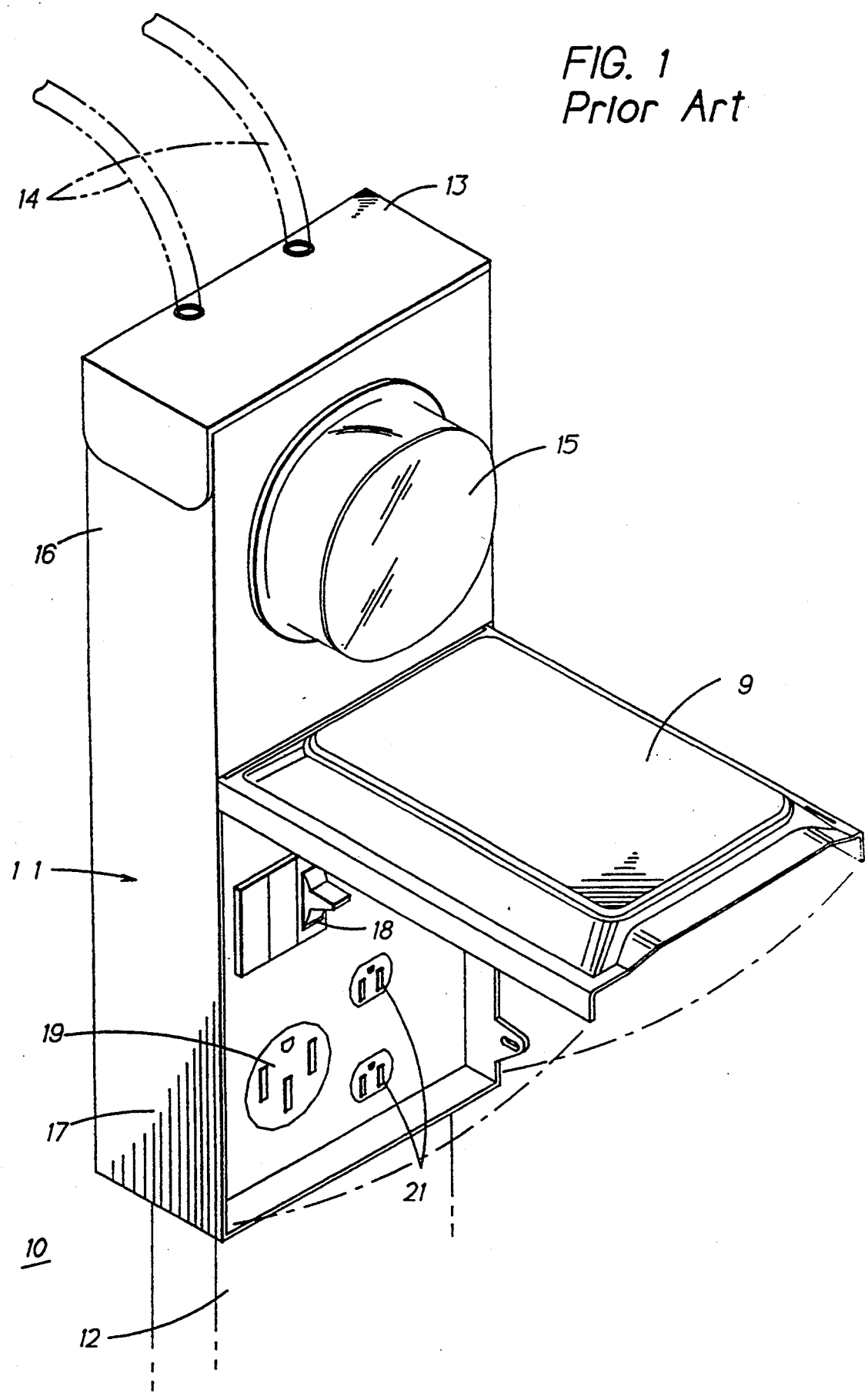
FIG. 1 is a front perspective view of a temporary construction site power center according to the Prior Art.

Before describing the integrated load center of the invention it is helpful to review a load center 10 such as shown in FIG. 1. The arrangement is similar to that described within the aforementioned U.S. Pat. Nos. 3,716,762 and 4,025,825 wherein a metallic housing 11 is fastened to a post 12 at the construction site and is connected with the overhead utility power cables 14 through an opening in the top cover 13. To facilitate connection with the power meter 15, the meter compartment 16 which houses the meter, is arranged on the top of the power receptacles compartment 17 which houses the circuit breaker 18, high voltage outlet 19 and residential voltage outlets 21. The access door 9 to the power receptacles compartment is depicted in its fully-open position.

Figure 4:
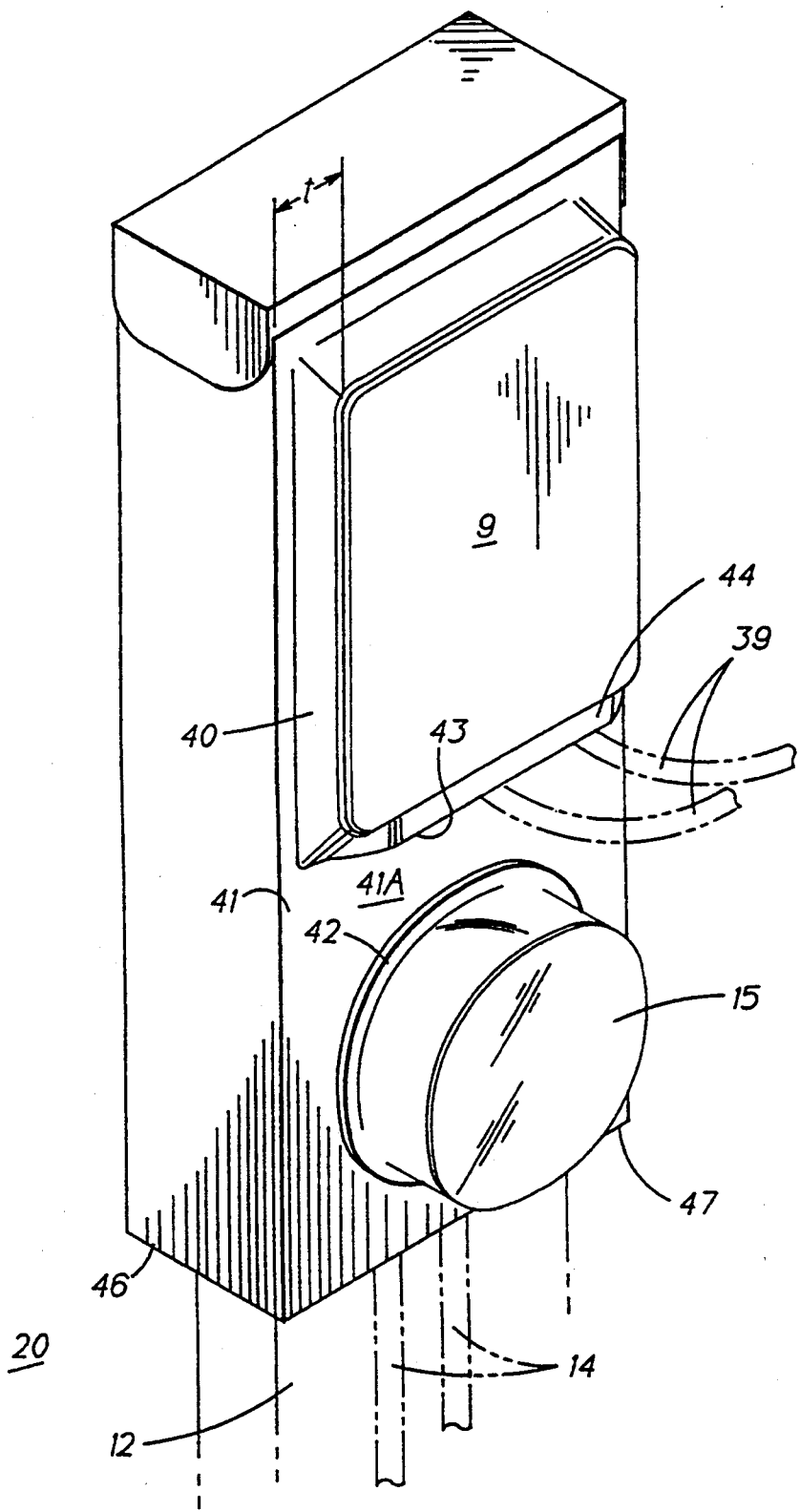
FIG. 4 is front perspective view of the integrated load center of the invention connected with underground utility conductors.

The integrated power center 20 according to the invention is shown in FIGS. 2, 3 and 4 and contains a lower meter compartment 23 which houses the meter socket 25. The meter socket connects with the external utility underground cables by means of a first pair of terminals 30 and the cables enter the housing 22 by means of openings 31 through the bottom of the housing 22. The meter socket connects with the circuit breaker 18 by means of a second pair of terminals 26 and by the conductors 28, 29. The conductors pass under the metallic barrier 36 that prevents access to the meter compartment 23 from the power receptacles compartment 24 to deter tampering with the meter connections. The high voltage outlet 19 connects with the load side of the circuit breaker 18 by means of conductors 32, 33. The ground connection with the receptacle over conductor 35 is indicated at 34. The residential voltage outlets are omitted for purposes of clarity.

In further accordance with the teachings of the invention, the integrated power center 20 is attached to the support post 12 with the meter compartment 23 under the power receptacles compartment 24 and separated by the barrier 36. The latch 37 allows the power receptacles access door 9 to be locked in its closed position to prevent unpermitted access to the power receptacles if desired. The sides 40 of the door 9 extend a thickness t and a slotted opening 43 is defined between the bottom of the door and the surface 41A of the meter enclosure panel 41 to allow egress of the power take-off cables 39, which are depicted in phantom. With so-called "ringless" meters, a supplemental ring 42 is arranged around the interface between the meter 15 and the surface 41A to environmentally seal the meter interface and to prevent meter tampering. The underground utility cables 14, depicted in phantom, provide incoming power to the power center and are environmentally-protected by means of the overhang provided by the sides 46 and bottom 47 of the enclosure. Additional protection to both the power take-off cables 39 as well as the meter ring 42 and part of the meter 15, itself, is provided by the perimetric rim or extension 44 formed on the bottom of the door 9. The additional environmental protection provided by the placement of the meter, power take-off cables and utility underground cables is an important feature of the invention.

As integral power center for temporary construction sites containing a meter compartment subjacent a power receptacles compartment has herein been disclosed. Added environmental protection to all the connection cables as well as to the meter itself is provided by the overhang presented by the superjacent power receptacles compartment.

We claim:

1. A modular load center for temporary utility power connection comprising:
    an elongated enclosure;
    a hingebly-mounted door arranged over a top part of said enclosure, said top part defining a power take-off compartment;
    a circuit breaker within said power take-off compartment electrically connected with at least one power receptacle;
    a meter compartment within said enclosure subajacent said power take-off compartment, an electric power meter within said meter compartment, said meter being electrically connected in series with said circuit breaker and arranged for electrical connection with an electric utility power distribution system; and a supplemental ring arranged on a surface of said enclosure around said meter preventing external access to said electric meter, said meter extending through said supplemental ring for visual access thereto.

2. The modular load center of claim 1 including a perimetric rim on an edge of said cover and an elongated wire egress slot under said rim.

3. The modular load center of claim 2 wherein said meter further includes a rim seal interfacing a lower part of said meter and said supplemental ring, said rim seal providing environmental protection to said lower part.

4. The modular load center of claim 2 wherein said perimetric rim further provides environmental protection to power take-off cables connecting with said at least one power receptacle.

5. The modular load center of claim 2 wherein said perimetric rim further provides environmental protection to and utility power cables connecting with said electric meter.

6. The modular load center of claim 2 wherein said enclosure includes a locking hasp arranged for projection through a slot in said door for lockingly retaining said door against said power take-off compartment.

7. The modular load center of claim 2 whereby said door defines a front part extending a predetermined distance from said enclosure.

8. The modular load center of claim 2 whereby said enclosure is oriented in a vertical plane to thereby locate said power take-off compartment over said meter compartment so that said front part of said door extends said predetermined distance over said lower part of said meter.

* * * * *